(12) United States Patent
Gonen

(10) Patent No.: US 10,410,231 B2
(45) Date of Patent: *Sep. 10, 2019

(54) METHOD OF IMPLEMENTING AN INCENTIVE-BASED RECYCLING SYSTEM

(75) Inventor: Ron Gonen, New York, NY (US)

(73) Assignee: RECYCLEBANK LLC, New York, NY (US)

(*) Notice: Subject to any disclaimer, the term of this patent is extended or adjusted under 35 U.S.C. 154(b) by 852 days.

This patent is subject to a terminal disclaimer.

(21) Appl. No.: 12/041,454

(22) Filed: Mar. 3, 2008

(65) Prior Publication Data

US 2008/0172298 A1 Jul. 17, 2008

Related U.S. Application Data

(63) Continuation-in-part of application No. 11/854,387, filed on Sep. 12, 2007, which is a continuation-in-part
(Continued)

(51) Int. Cl.
*G06Q 30/00* (2012.01)
*G06Q 30/02* (2012.01)

(52) U.S. Cl.
CPC ......... *G06Q 30/0207* (2013.01); *G06Q 30/02* (2013.01); *G06Q 30/0226* (2013.01); *G06Q 30/0236* (2013.01)

(58) Field of Classification Search
CPC .................................................. G06Q 30/0207
(Continued)

(56) References Cited

U.S. PATENT DOCUMENTS

| | | | |
|---|---|---|---|
| 4,248,334 A | | 2/1981 | Hanley et al. |
| 4,949,528 A | * | 8/1990 | Palik .............................. 53/429 |

(Continued)

FOREIGN PATENT DOCUMENTS

| | | |
|---|---|---|
| JP | 13-195496 A | 7/2001 |
| JP | 2001-312551 | 9/2001 |

(Continued)

OTHER PUBLICATIONS

PCT/ISA/220, "Notification of Transmittal of the International Search Report . . . ", for PCT/US2007/079440, dated Apr. 23, 2008, (3 pgs).

(Continued)

*Primary Examiner* — Matthew L Hamilton
(74) *Attorney, Agent, or Firm* — John Maldjian; Maldjian Law Group LLC

(57) ABSTRACT

Embodiments of the present invention generally relate to a recycling system and method thereof. More specifically, embodiments of the present invention relate to a method of implementing an incentive-based recycling system which rewards clients for recycling recyclable goods via financial or other incentives. In one embodiment, a method of implementing a system of incentive-based recycling comprises dispatching a vehicle on a collection route, collecting recyclable material from a series of collection points, obtaining unique identification data from each collection point, dropping off recyclable material at a drop-off facility, uploading the unique identification data to a central database, and allocating rewards to a customer corresponding to a measurement of the unique identifying data.

9 Claims, 3 Drawing Sheets

Related U.S. Application Data of application No. 11/345,867, filed on Feb. 2, 2006, now Pat. No. 7,949,557.

(60) Provisional application No. 60/892,650, filed on Mar. 2, 2007, provisional application No. 60/825,383, filed on Sep. 12, 2006, provisional application No. 60/650,610, filed on Feb. 7, 2005.

(58) Field of Classification Search
USPC .......................................................... 705/14
See application file for complete search history.

(56) References Cited

U.S. PATENT DOCUMENTS

| | | | |
|---|---|---|---|
| 5,035,564 A | 7/1991 | Matsumoto | |
| 5,072,833 A | 12/1991 | Hansen et al. | |
| 5,119,894 A | 6/1992 | Crawford et al. | |
| 5,209,312 A | 5/1993 | Jensen | |
| 5,209,361 A | 5/1993 | Grubb, Jr. | |
| 5,230,393 A | 7/1993 | Mezey | |
| 5,251,761 A | 10/1993 | Hansen et al. | |
| 5,304,744 A | 4/1994 | Jensen | |
| 5,333,984 A | 8/1994 | Bayne et al. | |
| 5,355,987 A | 10/1994 | DeWoolfson et al. | |
| 5,416,279 A | 5/1995 | Tseng | |
| 5,425,456 A | 6/1995 | Erikson | |
| 5,447,017 A | 9/1995 | Becher et al. | |
| 5,484,246 A | 1/1996 | Horning et al. | |
| 5,628,412 A | 5/1997 | Hulls | |
| 5,699,525 A | 12/1997 | Enbutsu et al. | |
| 5,704,558 A | 1/1998 | Arrott | |
| 5,833,429 A | 11/1998 | McNeilus et al. | |
| 5,837,945 A | 11/1998 | Cornwell et al. | |
| 5,842,652 A | 12/1998 | Warsing et al. | |
| 5,871,114 A | 2/1999 | Anderson et al. | |
| 5,923,016 A | 7/1999 | Fredregill et al. | |
| 5,934,867 A | 8/1999 | Christenson | |
| 5,960,402 A | 9/1999 | Embutsu et al. | |
| 5,965,858 A | 10/1999 | Suzuki et al. | |
| 5,983,198 A | 11/1999 | Mowery et al. | |
| 6,026,370 A | 2/2000 | Jermyn | |
| 6,055,573 A | 4/2000 | Gardenswartz et al. | |
| 6,292,785 B1 | 9/2001 | McEvoy et al. | |
| 6,496,804 B2 | 2/2002 | McEvoy et al. | |
| 6,448,898 B1 | 9/2002 | Kasik | |
| 6,663,004 B2 | 12/2003 | Wagner et al. | |
| 6,664,897 B2 | 12/2003 | Pape et al. | |
| 6,718,343 B2 | 4/2004 | Kamata | |
| 6,952,625 B2 | 10/2005 | Uetake et al. | |
| 6,993,712 B2 | 1/2006 | Ramachandran et al. | |
| 7,032,820 B2 | 4/2006 | Kreiner et al. | |
| 7,133,895 B1 | 11/2006 | Lee et al. | |
| 7,134,084 B1 | 11/2006 | Rashid et al. | |
| 7,136,865 B1 | 11/2006 | Ra et al. | |
| 7,167,836 B2 | 1/2007 | Gottslig et al. | |
| 7,251,620 B2 | 7/2007 | Walker et al. | |
| 7,313,602 B2 | 12/2007 | Ono et al. | |
| 7,398,225 B2 | 7/2008 | Voltmer et al. | |
| 7,398,226 B2 | 7/2008 | Haines et al. | |
| 7,398,248 B2 | 7/2008 | Phillips et al. | |
| 7,424,441 B2 | 9/2008 | George et al. | |
| 7,428,498 B2 | 9/2008 | Voltmer et al. | |
| 7,496,524 B2 | 2/2009 | Voltmer et al. | |
| 7,999,688 B2 | 8/2011 | Healey et al. | |
| 2001/0047299 A1* | 11/2001 | Brewer et al. ................. | 705/14 |
| 2002/0026326 A1 | 2/2002 | Stevens | |
| 2002/0040564 A1 | 4/2002 | Killingbeck et al. | |
| 2002/0082920 A1 | 6/2002 | Austin et al. | |
| 2002/0188509 A1 | 12/2002 | Ariff et al. | |
| 2003/0040854 A1* | 2/2003 | Rendahl et al. ............... | 701/29 |
| 2003/0115097 A1 | 6/2003 | Sokei et al. | |
| 2003/0139981 A1 | 7/2003 | Mizuno et al. | |
| 2003/0158818 A1 | 8/2003 | George et al. | |
| 2003/0233278 A1 | 12/2003 | Marshall | |
| 2004/0167799 A1* | 8/2004 | Berry ................................ | 705/1 |
| 2004/0199401 A1 | 10/2004 | Wagner et al. | |
| 2004/0199545 A1 | 10/2004 | Wagner et al. | |
| 2004/0200689 A1 | 10/2004 | Compton et al. | |
| 2004/0243468 A1 | 12/2004 | Cohagan et al. | |
| 2005/0038572 A1* | 2/2005 | Krupowicz ................... | 700/305 |
| 2005/0043963 A1 | 2/2005 | Soga et al. | |
| 2005/0059849 A1 | 3/2005 | Liu | |
| 2005/0080520 A1 | 4/2005 | Kline et al. | |
| 2005/0131757 A1 | 6/2005 | Chan et al. | |
| 2005/0192963 A1 | 9/2005 | Tschiegg et al. | |
| 2005/0216369 A1* | 9/2005 | Honegger ...................... | 705/28 |
| 2005/0256767 A1 | 11/2005 | Friedman | |
| 2005/0273340 A1 | 12/2005 | Yamamoto | |
| 2006/0069588 A1 | 3/2006 | Ritter | |
| 2006/0080819 A1 | 4/2006 | McAllister | |
| 2006/0178933 A1 | 8/2006 | FitzGerald et al. | |
| 2006/0224450 A1 | 10/2006 | Moon | |
| 2006/0273180 A1 | 12/2006 | Ammond et al. | |
| 2007/0100694 A1 | 5/2007 | Kopps | |
| 2007/0102506 A1 | 5/2007 | Stevens | |
| 2007/0112632 A1 | 5/2007 | Voltmer et al. | |
| 2007/0174073 A1 | 7/2007 | Hunscher et al. | |
| 2007/0219862 A1* | 9/2007 | Casella et al. ................. | 705/14 |
| 2007/0260466 A1 | 11/2007 | Casella et al. | |
| 2008/0061124 A1 | 3/2008 | Langlois et al. | |
| 2008/0061125 A1 | 3/2008 | Langlois et al. | |
| 2008/0069641 A1 | 3/2008 | Kreiner et al. | |
| 2008/0077498 A1 | 3/2008 | Ariff et al. | |
| 2008/0077499 A1 | 3/2008 | Ariff et al. | |
| 2008/0086411 A1 | 4/2008 | Olson et al. | |
| 2008/0169342 A1 | 7/2008 | Gonen et al. | |
| 2008/0183634 A1 | 7/2008 | Sadler | |
| 2008/0208721 A1 | 8/2008 | Bertogg | |
| 2009/0125402 A1 | 5/2009 | Voltmer et al. | |
| 2009/0138358 A1 | 5/2009 | Gonen et al. | |
| 2009/0228406 A1 | 9/2009 | Lopez et al. | |
| 2011/0258128 A1 | 10/2011 | Hambleton | |
| 2015/0154568 A1 | 6/2015 | Gu | |

FOREIGN PATENT DOCUMENTS

| | | |
|---|---|---|
| JP | 2002-297840 | 10/2002 |
| JP | 2003-099520 | 4/2003 |
| JP | 2005-008339 | 1/2005 |
| KR | 10-2002-0084880 | 11/2002 |
| KR | 10-2006-0099489 | 9/2006 |
| KR | 10-2008-0008694 | 1/2008 |
| KR | 10-2008-0013246 | 2/2008 |

OTHER PUBLICATIONS

PCT/ISA/210, "International Search Report", for PCT/US2007/079440, dated Apr. 23, 2008, (3 pgs).

PCT/ISA/237, "Written Opinion of the International Searching Authority", for PCT/US2007/079440, dated Apr. 23, 2008, (5 pgs).

Form PCT/ISA/220, "Notification of Transmittal of the International Search Report . . . ", dated Jun. 16, 2009 for PCT/US2009/031129, (4 Pgs).

From PCT/ISA/237, "Written Opinion of the International Searching Authority", dated Jun. 16, 2009 for PCT/US2009/031129, (6 Pgs).

Form PCT/ISA/210, "International Search Report", dated Jun. 16, 2009 for PCT/US2009/031129, (4 Pgs).

PCT/ISA/220, "Notification of Transmittal of the International Search Report . . . ", for PCT/US2008/055687, dated Aug. 20, 2008, (3 pgs).

PCT/ISA/237, "Written Opinion of the International Searching Authority", for PCT/US2008/055687, dated Aug. 20, 2008, (5 pgs).

PCT/ISA/210, "International Search Report", for PCT/US2008/055687, dated Aug. 20, 2008, (3 pgs).

Office Action Received for Application No. 2,679,833 dated Mar. 8, 2013 (3 pages).

Office Action Received for Application No. 2,679,833 dated Jan. 16, 2014 (3 pages).

(56) References Cited

OTHER PUBLICATIONS

Office Action Received for Application No. MX/a/2009/009376 dated Jun. 27, 2013 (6 pages).
World Economic Forum Names RecycleBank a 2009 Technology Pioneer for at http://Corporate.RecycleBank.com/press-release . . . Dec. 4, 2008, 4 pages.
Jenny Mero, "Wasteful Thinking" Fortune Magazine, Apr. 2008, 1 page.
Int'l Search Report and Written Opinion for PCT/2008/055689 dated Jul. 17, 2008, 10 pages.
Int'l Search Report and Written Opinion for PCT/2008/074647 dated Mar. 25, 2009, 8 pages.
Int'l Search Report and Written Opinion for PCT/2009/042812 dated Dec. 21, 2009, 10 pages.
Int'l Search Report and Written Opinion for PCT/2010/021757 dated Aug. 31, 2010, 9 pages.
Int'l Search Report and Written Opinion for PCT/2010/025993 dated Oct. 29, 2010, 11 pages.
Int'l Search Report and Written Opinion for PCT/2009/042801 dated Nov. 30, 2009, 15 pages.

\* cited by examiner

METHOD OF IMPLEMENTING AN INCENTIVE-BASED RECYCLING SYSTEM

CROSS-REFERENCE TO RELATED APPLICATIONS

This application is a continuation-in-part of U.S. patent application Ser. No. 11/345,867, filed Feb. 2, 2006, entitled "Method and System for Improving Recycling Through the Use of Financial Incentives," which claims the benefit of U.S. Provisional Patent Application Ser. No. 60/650,610, filed Feb. 7, 2005. This application is also a continuation-in-part of U.S. patent application Ser. No. 11/854,387, filed Sep. 12, 2007, entitled "Method and System for Managing Recycling of Recyclable Material," which claims the benefit of U.S. Provisional Patent Application Ser. No. 60/825,383, filed Sep. 12, 2006. This application also claims the benefit of U.S. Provisional Patent Application Ser. No. 60/892,650, filed Mar. 2, 2007. The aforementioned applications are hereby incorporated by reference in their entirety.

BACKGROUND OF THE INVENTION

Field of the Invention

Embodiments of the present invention generally relate to a recycling system and method thereof. More specifically, embodiments of the present invention relate to a method of implementing an incentive-based recycling system which rewards clients for recycling recyclable goods via financial or other incentives.

Description of the Related Art

The recycling industry has become more and more active over the course of time, each year being more active than the last. Fueled by rising energy costs and diminishing supplies of natural resources, a great deal of time, money, and research has been put into the study of recycling processes, techniques, and methods. However, in order to install and conduct these recycling operations, the companies or individuals conducting these operations rely on a constant inflow of recyclable materials from environment-conscious consumers.

Currently in the United States, a great deal of money is spent in setting up programs and facilities which attempt to encourage consumers to recycle recyclable material. However, these programs and facilities fail to utilize persuasive techniques to convince consumers to recycle; that is, the programs fail to provide consumers with sufficient incentive to properly recycle recyclable materials. As such, much recyclable material, some of which is difficult or impossible to regenerate, such as aluminum, glass, and polymeric material, is being dumped into landfills, costing taxpayer money and the opportunity cost of saving energy by recycling.

Therefore, there is a need for a method of implementing an incentive-based recycling system.

SUMMARY OF THE INVENTION

Embodiments of the present invention generally relate to a recycling system and method thereof. More specifically, embodiments of the present invention relate to a method of implementing an incentive-based recycling system which rewards clients for recycling recyclable goods via financial or other incentives. In one embodiment, a method of implementing a system of incentive-based recycling comprises dispatching a vehicle on a collection route, collecting recyclable material from a series of collection points, obtaining unique identification data from each collection point, dropping off recyclable material at a drop-off facility, uploading the unique identification data to a central database, and allocating rewards to a customer corresponding to a measurement of the unique identifying data.

In another embodiment of the present invention, a method of implementing a system of incentive-based recycling comprises dispatching a vehicle on a collection route, acquiring and recording a unique set of identifying data from at least a collection point, weighing an amount of recyclable materials at each collection point, recording the weight of the recyclable materials, collecting the recyclable materials from the collection point, dropping off the recyclable material collected at a drop-off facility, validating the weight and identifying data collected from the collection point, uploading the data to a central database, generating at least one report, and allocating rewards to a customer corresponding to a unique set of identifying data.

In yet another embodiment of the present invention, a method of implementing a system of incentive-based recycling comprises receiving a quantity of recyclable material, ascertaining a quantitative measurement of the recyclable material, downloading a series of data points from a local database, verifying the series of data points, uploading the series of data points to a central database, generating at least one report from the data uploaded to the central database, and allocating rewards to a customer corresponding to a unique set of identifying data.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
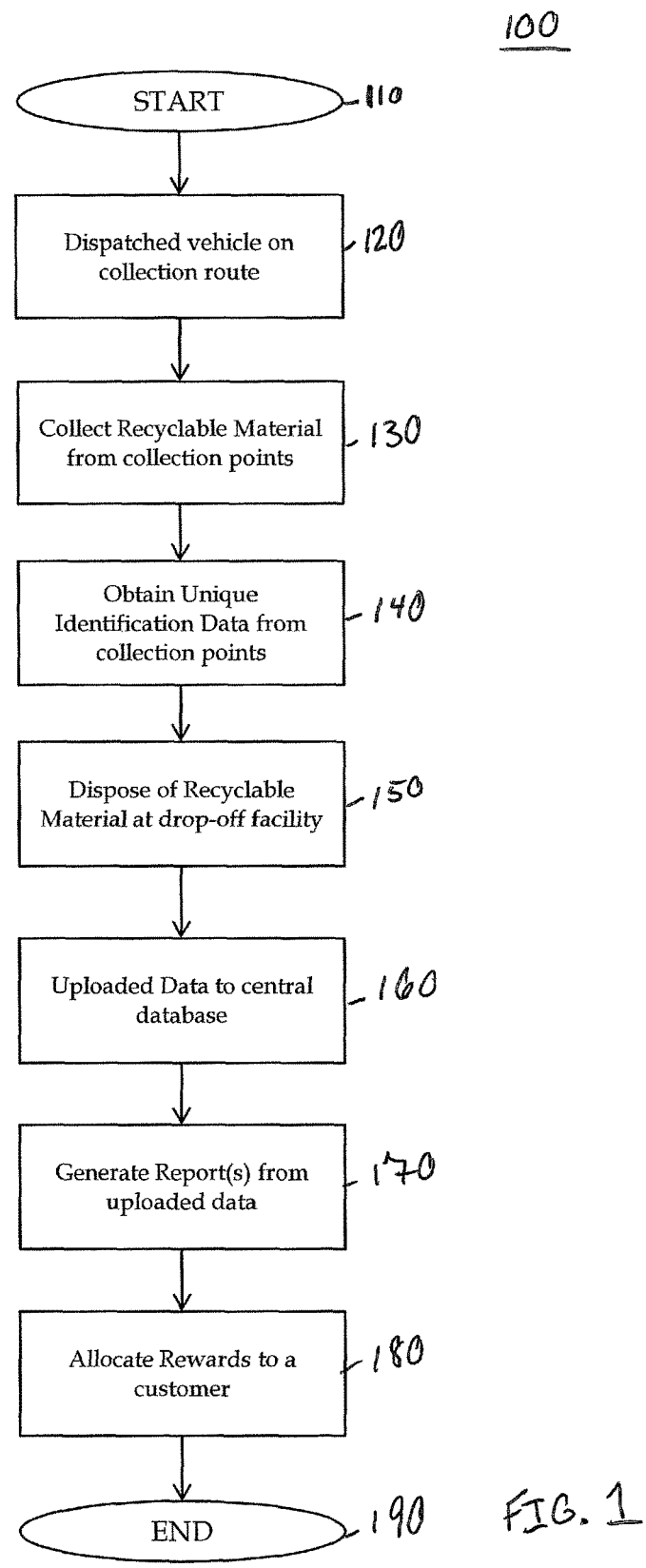
FIG. 1 depicts a flowchart illustrating an exemplary method in accordance with one embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the drawings.

DETAILED DESCRIPTION OF THE INVENTION

Embodiments of the present invention generally relate to a recycling system and method thereof. More specifically, embodiments of the present invention relate to a method of implementing an incentive-based recycling system which rewards clients for recycling recyclable goods via financial or other incentives.

Embodiments of the present invention are complimentary to an incentive-based recycling system. An exemplary incentive-based recycling system is disclosed in detail in commonly owned United States Patent Application Publication No. 2006/0178933, the disclosure of which is incorporated by reference herein in its entirety.

As used herein, the term "recyclable material" refers to any material which can be processed, treated, or otherwise altered in order to recover spent, used, or deteriorated material. "Recyclable material" may include, but is not limited to, metal, glass, plastics, polymers, paper, cardboard, batteries, oil, tires, textiles, timber, concrete, and any other suitable material in accordance with embodiments of the present invention.

As used herein, the term "record" and any derivative term thereof (i.e., "records," "recording," "recordable," "recordation," etc.) refers to any manner of logging data points. Recordation may be physical (e.g., written down using a writing implement in conjunction with paper), electronic (e.g., entering data into a database), or by any other method suitable for embodiments of the present invention.

As used herein, the term "database" may refer to any organized collection of data and/or any method of collecting such data. A database may take the form of a physical organization of data (e.g., a written document), an electronic computer database (e.g., Oracle, DB2, Microsoft Access, Microsoft SQL Server, Postgres, MySQL, 4th Dimension, FileMaker, Alpha Five Database Management System, or the like), or any other organizational system suitable for embodiments of the present invention.

As used herein, the term "download" and any derivative term thereof (i.e., "downloads," "downloading," "downloadable," etc.) refers to the act, or the product, of receiving a set of data from a database. Additionally, as used herein, the term "upload" and any derivative thereof (i.e., "uploads," "uploading," "uploadable," etc.) refers to the act, or the product, of sending a set of data to a database.

FIG. 1 depicts a flowchart illustrating an exemplary method in accordance with one embodiment of the present invention. The method 100 begins at step 110. In one embodiment, at step 120, a vehicle adapted for collection of recyclable materials is dispatched on a predetermined, planned route. The vehicle may be any vehicle suitable for embodiments of the present invention. In many embodiments, the vehicle has been adapted for collection, optionally featuring such components as a storage bin, compactor, fork, shovel, scoop, or any other component suitable for embodiments of the present invention or any combination thereof. One exemplary type of vehicle is a "garbage truck," such as the type disclosed by U.S. Pat. No. 4,242,311, which is incorporated herein by reference in its entirety.

At step 130, along the route, the vehicle stops at a series of collection points to collect recyclable material. The collection points may comprise single family residences, places of business, apartment complexes, or the like. At each collection point, the vehicle collects a quantitative or qualitative measure of recyclable material. Generally, such recyclable material is contained within a bin or other storage container when collected. In many embodiments, the qualitative or quantitative measurement of recyclable material takes into consideration the weight or volume of the storage container. One exemplary storage container is disclosed by United States Patent Application Publication No. 2006/0273180, the disclosure of which is incorporated herein by reference in its entirety.

At step 140, in one embodiment, as the recyclable material is being collected at each collection point 130, a set of unique identification data from the collection point is obtained. In many embodiments, the unique identification data comprises at least one or more of a location identifier (e.g., a street address, a set of GPS coordinates, a alphanumeric identifier corresponding to a location identifier, or the like), a temporal identifier (e.g., date, time, etc.), a qualitative or quantitative measurement from the recyclable materials (e.g., a weight, volume, mass, composition of the recyclable materials or the like), or a system-specific identifier (e.g., the color of a storage container, the type of designated "route," etc.). As understood by embodiments of the present invention, the unique identification data may comprise any additional information suitable for embodiments of the present invention to employ an embodiment of an incentive-based recycling system.

Figure 2:
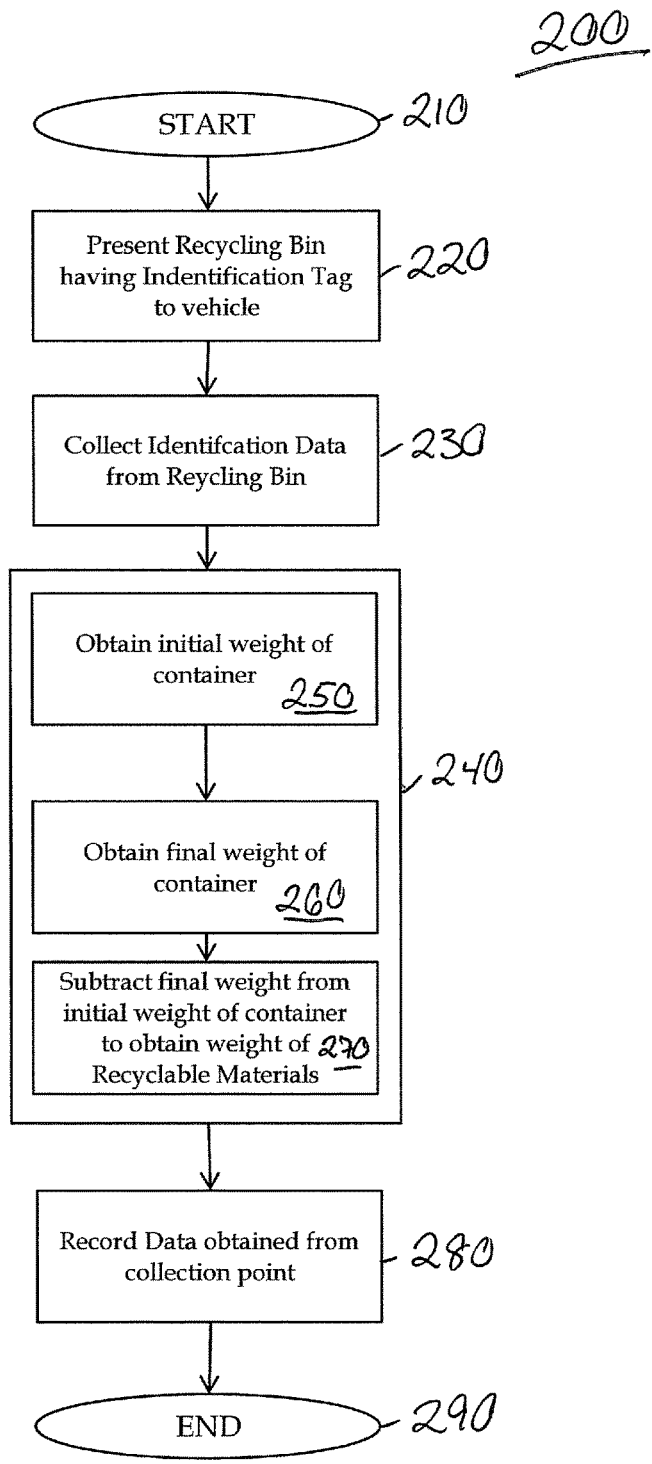
FIG. 2 depicts a flowchart illustrating an exemplary method in accordance with one embodiment of the present invention.

In accordance with one embodiment of the present invention, obtaining unique identification data from a collection point comprises obtaining information from an identification tag (e.g., a RFID tag, bar-code, magnetic-strip, etc.) on a recycling bin and measuring the weight of the recyclable materials. An exemplary method 200 of obtaining unique identification data from a collection point is depicted in the flowchart of FIG. 2, which begins at step 210. At step 220, a recycling bin containing recyclable materials, and possessing an identification tag, is presented to the vehicle at a collection point. At step 230, a reader (e.g., an RFID tag reader, a bar-code reader, a magnetic strip reader, etc.) located on the vehicle reads the identification tag of the recycling bin to obtain unique identification data contained thereon.

At step 240 a quantitative measurement of the recyclable materials is obtained by obtaining the weight of such materials. In accordance with one exemplary embodiment, a weight of the recyclable materials is obtained by first measuring a weight of the recycling bin while containing the recyclable materials at step 250. Then, at step 260, a weight of the recycling bin after emptying the recyclable materials into vehicle is measured. To obtain a final quantitative measurement of the recyclable materials, at step 270, the weight of the bin is subtracted from the weight of the bin containing the recyclable materials. As understood by embodiments of the present invention, each of steps 240, 250, 260 and 270 may utilize an on-board weighing device, such as the weighing device disclosed by U.S. Pat. No. 5,119,894, the disclosure of which is incorporated herein by reference in its entirety.

At step 280, the unique identification data obtained from the collection point is recorded in a memory device on the vehicle. Alternatively, however, the unique identification data may be wireless uploaded to a database, such that no memory, or nominal memory is required on-board the vehicle for such purposes. The method 200 ends at step 290.

Returning the flowchart of FIG. 1, once the unique identification data has been obtained from each of the collection points, and/or once the vehicle becomes full of recyclable material, the vehicle enters a drop-off facility, where it can unload the recyclable material for further processing, at step 150. A drop-off facility may comprise a processing or treatment recycling plant, a landfill, a general waste management facility, a place of business in the trade of handling recyclable materials, or the like.

At step 160, as the recyclable materials are being removed from the vehicle, the unique identification data is uploaded to a central computer system. The central computer system may be any computer suitable for embodiments for the present invention. In many embodiments, the step of uploading data to a central computer system comprises providing a direct link between a memory on the vehicle and a database on a computer system located at the drop-off facility. Alternatively, however, the database may be addressable through a network connection to a computer at the drop-off facility. A more detailed description of the database and associated communication of data is disclosed by related U.S. patent application Ser. No. 11/854,387, which is incorporated by reference herein in its entirety.

Optionally, as the unique identification data is uploaded to the central computer system, a validation process checks the values of the data to ensure its compliance with the rules and formats set forth by the system. For example, the validation process may first convert raw data collected along the route to a format which is readable by a central database system. Then, the validation process may review the data to ensure there are no duplicate data points and/or incomplete data points. If any duplicate or incomplete points exist, the validation process may remove these points from the set of data uploaded to the system.

At the central database, uploaded data points may be analyzed and organized according to any number of analytical methods. At step 170, at least one report representative of the uploaded data is generated. The report may present the data points and/or analysis of such points in any format or presentation medium suitable for embodiments of the present invention. For example, the report may comprise an analysis of the unique identification data for a specific collection route on a specific day. Alternatively, the report may comprise an analysis of the unique identification data for a specific collection point on a specific collection route over a period of time.

At step 180, a set of rewards is allocated to a customer or client associated with a unique set of identification data collected from a collection point. The rewards may be financial in nature (e.g., monetary rewards) or any other type of rewards feasible in the context of the present invention. In one embodiment of the present invention, rewards may comprise cash, a credit, such as a gift certificate to a commercial establishment, points or tokens, which may be redeemable or accumulative for any purpose. Often, the rewards may be allocated electronically (e.g., a transaction between two bank accounts, an entry into an electronic database), physically (e.g., a check or money order, a certificate), or by any method suitable for embodiments of the present invention.

In one embodiment of the present invention, a quantity of rewards (hereinafter referred to generally as "units") are allocated to a customer in an amount proportionate to the recyclable material collected from a collection point associated with that customer. In such an embodiment, the number of reward units allocated to any customer or client may be calculated or otherwise determined using a predetermined algorithm based on the quantity, quality, composition, or other characteristic of the recyclable materials or unique identification data obtained at the respective collection point.

In another embodiment of the present invention, rewards are allocated to a customer in a fixed amount. In such an embodiment, the central database may be queried to determine if a vehicle collected recyclable material from a collection point corresponding to a customer. If so, the customer may be credited with a fixed amount of reward units. In another embodiment, a customer may be credited with a fixed amount of reward units regardless of the collection of recyclable material, but for merely signing up with the incentive-based recycling system.

In another embodiment of the present invention, rewards are allocated to a customer in an amount based on the total amount of recyclable material collected from a series of collection points. In one embodiment, each of a series of customers, each corresponding to one or more collection points, may be allocated a fixed amount of units. In another embodiment, each of a series of customers, corresponding to one or more collection points, may be allocated an amount of units which is proportionate to the amount of recyclable material collected at the collection point or collection points which correspond to the customer.

Figure 3:
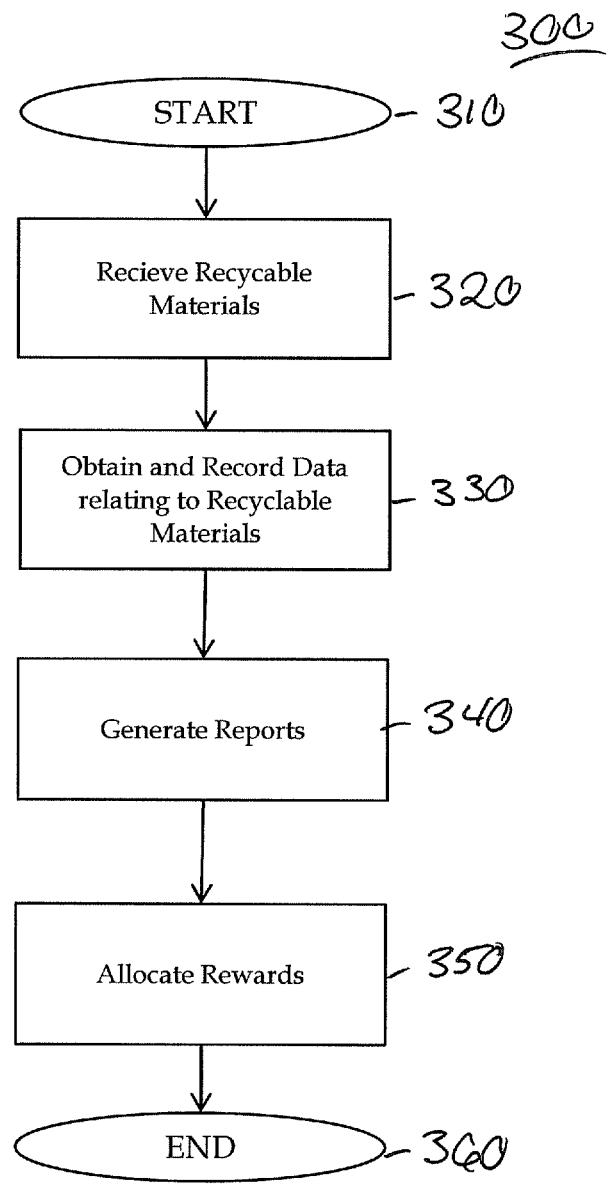
FIG. 3 depicts a flowchart illustrating an exemplary method in accordance with one embodiment of the present invention.

FIG. 3 depicts a flowchart illustrating an exemplary method in accordance with one embodiment of the present invention. The method 300 begins at step 310, and at step 320, a recycling plant, treatment facility, or other processing facility receives a volume of recyclable material. The material may be collected from a vehicle or a plurality of vehicles, as well as from individual recycling customers dropping off materials themselves.

At step 330, a measurement is taken and recorded of a quantitative amount of recyclable material received by the processing facility. In one embodiment, the measurement may be obtained by measuring and recording the initial weight of the vehicle or container having the recyclable materials, emptying the recyclable material from the container or vehicle, and then measuring and recording the final weight of the container or vehicle. The initial weight subtracted from the final weight yields the weight of the recyclable materials received by the processing facility.

In an alternative embodiment, the data may be transcribed, downloaded, or otherwise transferred from a memory or database on the vehicle. The data may then be verified to ensure that no duplicate data points or incomplete data points are present in the data. The validated data points are then uploaded to a central database in order to centralize the measurements and recorded data. At the central database, any number of calculations may be conducted or additional fields or identifiers added without departing from the scope of embodiments of the present invention.

At step 340, at least one report is generated from the uploaded data, reflective of such data. The contents of the report are discussed in greater detail above with respect to other embodiments of the present invention. At step 350, a set of rewards are allocated to a customer corresponding to a unique set of identifying data. Rewards may be allocated to a customer based on any method of reward allocation as described above, including proportional rewards allocation, fixed rewards allocation, and any other method of rewards allocation feasible in the context of the present invention. The method 300 ends at step 360.

While the foregoing is directed to embodiments of the present invention, other and further embodiments of the invention may be devised without departing from the basic scope thereof.

What is claimed is:

1. A method of encouraging recycling using one or more bins having identification tags at a plurality of corresponding geographic collection points, each tag corresponding to one of a plurality of customers, the method comprising the steps of:

receiving, at the geographic collection points, a quantity of recyclable material from the one or more bins associated with at least one customer of the plurality of customers and identification information of the at least one customer by a recycling pickup vehicle having a processor, a tag reader, and a weighing device, wherein the tag reader receives the identification information from the identification tag on the one or more bins ascertaining, by the weighing device, a quantitative measurement of the recyclable material deposited in the one or more bins, at each of the geographic collection points;

storing, by the processor, the received identification information and the ascertained quantitative measurement of the recyclable material from the plurality of collection points along a predetermined route;

in response to unloading the quantity of recyclable material from the recycling pickup vehicle:
validating, for each of the plurality of customers, the received identification information and the ascertained quantitative measurement, wherein the validating converts data into a readable format and removes duplicate and incomplete information;
uploading, to a central computer connected to the processor via a wireless network, the validated quantity of recyclable material and the identification information;
generating at least one report from the uploaded quantity of recyclable material and the identification information; and
allocating rewards to each of the plurality of customers corresponding to the identification information.

2. The method of claim 1, wherein the rewards are allocated in an amount commensurate with at least one of a proportionate value, quantity and amount of the recyclable material collected from the geographic collection points associated with the each customer, a fixed amount, and a total amount of recyclable material collected.

3. The method of claim 1, wherein the step of validating comprises:
determining unique identities at the plurality of geographic collection points; and
eliminating duplicate and incomplete unique identities.

4. The method of claim 3, wherein the unique identities of the geographic collection points comprise at least a plurality of location identifiers, temporal identifiers, qualitative and quantitative measurements, and system-specific identifiers.

5. The method of claim 4, wherein the plurality of location identifiers comprise at least one of a street address, Global Positioning System (GPS) coordinates, and an alphanumeric identifier corresponding to a location of each of the geographic collection points.

6. The method of claim 4, wherein the plurality of temporal identifiers comprise at least one of a date and time.

7. The method of claim 4, wherein the qualitative and quantitative measurements comprise at least one of a weight, volume, mass, and composition of the recyclable material.

8. The method of claim 4, wherein the system-specific identifiers comprise at least one of a color of a storage container and a type of a route of the recycling pickup vehicle.

9. A system of encouraging recycling using one or more bins having identification tags at a plurality of corresponding geographic collection points, each tag corresponding to one of a plurality of customers, the system comprising:
a recycling pickup vehicle
configured to receive, at the geographic collection points, a quantity of recyclable material from the one or more bins associated with at least one customer of the plurality of customers;
a tag reader attached to the recycling pickup vehicle and configured to receive from the identification tag on the one or more bins at the geographic collection points, identification information of the at least one customer;
a weighing device attached to the recycling pickup vehicle and configured to ascertain a quantitative measurement of the recyclable material deposited in the one or more bins at each of the geographic collection points; and
a processor attached to the recycling pickup vehicle and configured to:
store the received identification information and the ascertained quantitative measurement of the recyclable material from the plurality of collection points along a predetermined route; and
in response to unloading the quantity of recyclable material from the recycling pickup vehicle:
validate, for each of the plurality of customers, the received identification information and the ascertained quantitative measurement, wherein the validating converts data into a readable format and removes duplicate and incomplete information;
upload, to a central computer connected to the processor via a wireless network, the validated quantity of recyclable material and the identification information;
generate at least one report from the uploaded quantity of recyclable material and the identification information; and
allocate rewards to each of the plurality of customers corresponding to the identification information.

* * * * *